(12) United States Patent
Oshima et al.

(10) Patent No.: US 10,560,624 B2
(45) Date of Patent: Feb. 11, 2020

(54) IMAGING CONTROL DEVICE, IMAGING CONTROL METHOD, CAMERA, CAMERA SYSTEM, AND PROGRAM

(71) Applicant: FUJIFILM Corporation, Tokyo (JP)

(72) Inventors: Hiroyuki Oshima, Saitama (JP); Mikio Watanabe, Saitama (JP); Takeshi Misawa, Saitama (JP); Masaya Tamaru, Saitama (JP); Daisuke Hayashi, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 293 days.

(21) Appl. No.: 15/437,839

(22) Filed: Feb. 21, 2017

(65) Prior Publication Data

US 2017/0163881 A1 Jun. 8, 2017

Related U.S. Application Data

(63) Continuation of application No. PCT/JP2015/068041, filed on Jun. 23, 2015.

(30) Foreign Application Priority Data

Sep. 10, 2014 (JP) .................. 2014-183917

(51) Int. Cl.
*H04N 5/232* (2006.01)
*H04N 7/18* (2006.01)
(Continued)

(52) U.S. Cl.
CPC ....... *H04N 5/23216* (2013.01); *G01S 3/7864* (2013.01); *G03B 15/00* (2013.01);
(Continued)

(58) Field of Classification Search
CPC . H04N 5/23212; H04N 5/225; H04N 5/23216
See application file for complete search history.

(56) References Cited

U.S. PATENT DOCUMENTS

2012/0057037 A1* 3/2012 Ono .................. H04N 5/225
348/211.9
2012/0105647 A1 5/2012 Yoshizumi
(Continued)

FOREIGN PATENT DOCUMENTS

JP 2003-60972 A 2/2003
JP 2004-15516 A 1/2004
(Continued)

OTHER PUBLICATIONS

International Search Report issued in PCT/JP2015/068041 (PCT/ISA/210), dated Sep. 1, 2015.
(Continued)

*Primary Examiner* — Rowina J Cattungal
(74) *Attorney, Agent, or Firm* — Birch, Stewart, Kolasch & Birch, LLP

(57) ABSTRACT

An imaging control device according to an aspect of the present invention comprises a motion vector calculation unit that calculates a motion vector of a tracking target on the basis of a moving image obtained by an imaging unit, a tracking direction instruction input unit that receives an input of a tracking direction instruction indicating a specific tracking direction for tracking the tracking target, a tracking direction motion component extraction unit that extracts a motion component in the specific tracking direction from the motion vector of the tracking target on the basis of the tracking direction instruction; and a drive information generation unit that generates drive information of only the
(Continued)

specific tracking direction of a pan and tilt mechanism on the basis of the extracted motion component in the specific tracking direction.

12 Claims, 11 Drawing Sheets

(51) Int. Cl.
  *G03B 15/00* (2006.01)
  *G01S 3/786* (2006.01)
  *H04N 5/14* (2006.01)
  *G03B 37/02* (2006.01)

(52) U.S. Cl.
  CPC ............ *H04N 5/144* (2013.01); *H04N 5/232* (2013.01); *H04N 5/23212* (2013.01); *H04N 5/23254* (2013.01); *H04N 5/23296* (2013.01); *H04N 7/18* (2013.01); *H04N 7/183* (2013.01); *G03B 37/02* (2013.01); *G03B 2206/00* (2013.01)

(56) References Cited

U.S. PATENT DOCUMENTS

| | | | |
|---|---|---|---|
| 2013/0120586 A1* | 5/2013 | Takashima | H04N 5/225 348/169 |
| 2014/0168448 A1* | 6/2014 | Ozawa | H04N 5/23216 348/170 |
| 2015/0029332 A1* | 1/2015 | Milstead | H04N 7/183 348/143 |

FOREIGN PATENT DOCUMENTS

| | | |
|---|---|---|
| JP | 2006-317701 A | 11/2006 |
| JP | 2010-41299 A | 2/2010 |
| JP | 2011-30040 A | 2/2011 |
| JP | 2013-106266 A | 5/2013 |

OTHER PUBLICATIONS

Written Opinion of the International Searching Authority issued in PCT/JP2015/068041 (PCT/ISA/237), dated Sep. 1, 2015.

* cited by examiner

IMAGING CONTROL DEVICE, IMAGING CONTROL METHOD, CAMERA, CAMERA SYSTEM, AND PROGRAM

CROSS-REFERENCE TO RELATED APPLICATIONS

This application is a Continuation of PCT International Application No. PCT/JP2015/068041 filed on Jun. 23, 2015, which claims priority under 35 U.S.C. § 119(a) to Japanese Patent Application No. 2014-183917 filed on Sep. 10, 2014. Each of the above applications is hereby expressly incorporated by reference, in their entirety, into the present application.

BACKGROUND OF THE INVENTION

1. Field of the Invention

The present invention relates to an imaging control device, an imaging control method, a camera, a camera system, and a program, and more particularly, to imaging control using a camera capable of rotating an imaging unit in a pan direction and a tilt direction.

2. Description of the Related Art

In the related art, a subject that is a tracking target has been tracked using a pan and tilt camera capable of rotating an imaging unit that images the subject in a pan direction and a tilt direction.

JP2010-41299A discloses a camera that detects a motion vector of a subject on the basis of a captured image to track the subject on a display screen, and automatically captures a still image in a case where the target that is a tracking target reaches the inside of a predetermined frame on the display screen.

JP2004-15516A discloses a method of detecting a motion vector of a subject on the basis of a captured image of a wide angle camera and estimating a direction in which there is the subject when viewed from the wide angle camera to calculate a pan angle and a tilt angle of a pan and tilt camera, and tracking a subject using the pan and tilt camera.

JP2006-317701A discloses a configuration of a camera in which a user can select a constant direction movement imaging mode for imaging a subject moving in a substantially constant direction and a movement direction change imaging mode for imaging an irregularly moving subject, and in the movement direction change imaging mode, focus adjustment is performed with a smaller coefficient for a focus detection result than that in the constant direction movement imaging mode to limit an influence of tracking on the focus adjustment. With this configuration, erroneous detection of tracking a subject other than the tracking target is prevented.

SUMMARY OF THE INVENTION

If a motion of the tracking target is detected on the basis of a captured image and an imaging unit of the pan and tilt camera is rotated in a pan direction and a tilt direction to follow the motion of the tracking target as illustrated in FIG. 14 in a case where tracking of the subject is performed using the pan and tilt camera, the imaging unit of the pan and tilt camera always moves in a clockwise direction and a counterclockwise direction in both of the pan direction and the tilt direction according to the motion of the tracking target. Therefore, there is a problem in that the image of the tracking target is shaken on the display screen on which a captured image is displayed and is difficult to view, and eyes of a user who observes the image of the shaky subject are easily tired.

Further, there is a problem is that for example, it is difficult to track the subject by adjusting a rotation speed of the pan and tilt camera by operating an arrow key or the like in a case where the subject irregularly moves.

JP2010-41299A and JP2004-15516A do not consider that the target that is a tracking target actually moves in each of up, down, left, and right directions, as well as one specific direction.

Since the invention disclosed in JP2010-41299A is not a pan and tilt camera, the subject is merely tracked on the display screen and a rotation speed of the pan and tilt camera cannot be adjusted according to a movement speed of the subject. Further, since the subject is tracked in all of up, down, left, and right directions on the basis of the motion vector of the subject detected from the captured image, eyes of a user who observes an image of a shaky subject are easily tired in a case where an irregularly moving subject is tracked.

In the invention disclosed in JP2004-15516A, the motion vector of the subject is detected on the basis of the captured image of the wide angle camera, and it is realistically difficult for a rotation speed of the pan and tilt camera to be adjusted with good follow-up according to a movement speed of the subject. Further, since the subject is tracked in all of up, down, left, and right directions on the basis of the motion vector of the subject detected from the captured image, eyes of a user who observes an image of a shaky subject are easily tired in a case where an irregularly moving subject is tracked.

The camera disclosed in JP2006-317701A is not a pan and tilt camera and JP2006-317701A does not disclose and suggest a technology that makes it possible to adjust a rotation speed of the pan and tilt camera according to a movement speed of a subject. JP2006-317701A only discloses that an influence of tracking on focus adjustment is limited regardless of a movement direction of a tracking target in a case where a movement direction change imaging mode suitable for imaging of an irregularly moving subject is selected by a user. Therefore, even when the technology described in JP2006-317701A is adopted in the pan and tilt camera, both of making it possible to adjust a rotation speed of a pan and tilt camera appropriately with good follow-up according to a movement speed of a subject, and making it possible to display a tracking image that is easy to view and does not cause fatigue cannot be realized.

The present invention has been made in view of the above-described circumstances, and an object of the present invention is to make it possible to adjust a rotation speed of a camera appropriately with good follow-up according to a movement speed of a subject through a simple operation, and to display a tracking image that is easy to view and does not cause fatigue in a case where a subject is tracked using a camera capable of rotating an imaging unit in a pan direction and a tilt direction.

An aspect of the present invention relates to an imaging control device that controls a camera including an imaging unit including an imaging lens and an imaging element, a pan and tilt mechanism capable of rotating the imaging unit in a pan direction and a tilt direction, and a pan and tilt driving unit that drives the pan and tilt mechanism, the imaging control device comprising: a motion vector calculation unit that calculates a motion vector of a tracking target on the basis of a moving image obtained by the imaging unit; a tracking direction instruction input unit that receives an input of a tracking direction instruction indicating a specific tracking direction for tracking the tracking target; a tracking direction motion component extraction unit that extracts a motion component in the specific tracking direction from the motion vector of the tracking target on the basis of the tracking direction instruction; and a drive information generation unit that generates drive information of only the specific tracking direction of the pan and tilt mechanism on the basis of the extracted motion component in the specific tracking direction.

According to this aspect, since the specific tracking direction is instructed and input by the tracking direction instruction input unit, the motion vector of the tracking target is calculated on the basis of the moving image by the motion vector calculation unit, the motion component in the specific tracking direction is extracted from the motion vector of the tracking target by the tracking direction motion component extraction unit, and the drive information of only the specific tracking direction is generated on the basis of the motion component in the specific tracking direction by the drive information generation unit, it is possible to track the tracking target only in the specific tracking direction using the camera through a simple operation such as the input of the instruction of the specific tracking direction, adjust the rotation speed of the camera appropriately with good follow-up according to the movement speed of the subject, and display a tracking image that is easy to view and does not cause fatigue.

According to an aspect of the present invention, the drive information generation unit generates drive information for the next time on the basis of drive information generated in a previous time and the motion component in the specific tracking direction extracted in a state in which the pan and tilt mechanism of the camera is driven according to the drive information generated in the previous time.

According to this aspect, since the drive information for the next time is generated on the basis of the drive information generated in a previous time and the motion component in the specific tracking direction extracted in a state in which the pan and tilt mechanism of the camera is driven according to the drive information generated in the previous time, the calculation of the drive information is simple and is performed at a low load. For example, a specific example of the drive information may include an angular velocity of the rotation of the imaging unit, and a specific example of the extracted motion component in the specific tracking direction may include an error of a position of the tracking target on a display screen.

In an aspect of the present invention, the calculation of the motion vector of the tracking target, the extraction of the motion component in the tracking direction, and the generation of the drive information are repeatedly performed during a period in which an input of an instruction of the tracking direction to the tracking direction instruction input unit is continuous.

According to this aspect, the tracking only in the specific tracking direction can end for return to normal tracking when the tracking only in the specific tracking direction of which the instruction is continuously input and the input of the instruction of the tracking direction stop (for example, when a finger or the like is released from a specific key) during a period in which the input of the instruction of the tracking direction is continuous (for example, while a specific key is kept pressed by a finger or the like).

In an aspect of the present invention, when an input of an instruction of the tracking direction to the tracking direction instruction input unit is performed once, the calculation of the motion vector of the tracking target, the extraction of the motion component in the tracking direction, and the generation of the drive information are repeatedly executed until an input of an instruction to release the tracking direction to the tracking direction instruction input unit is performed or until a certain time elapses.

According to this aspect, it is possible to perform the tracking only in the specific tracking direction of which the instruction is continuously input by performing the input of the instruction of the tracking direction once (for example, by pressing a specific key once).

In an aspect of the present invention, the tracking direction instruction input unit receives an input of an instruction of any one of the pan direction and the tilt direction as the specific tracking direction.

According to this embodiment, it is possible to perform tracking only in any one of the pan direction and the tilt direction through a simple operation such as designation of any one of the pan direction and the tilt direction as the tracking direction.

In an aspect of the present invention, the tracking direction instruction input unit receives an input of a direction in which a component in the pan direction and a component in the tilt direction are mixed as the specific tracking direction.

According to this aspect, since the direction in which the component in the pan direction and the component in the tilt direction are mixed can be instructed and input as the tracking direction, it is possible to instruct various directions as the tracking direction.

In an aspect of the present invention, the imaging control device further comprises: a display unit that displays a moving image or a still image obtained by the camera; and a tracking target instruction input unit that receives an input of an instruction of the tracking target in the image displayed on the display unit.

According to this aspect, since the tracking target can be selected from the image displayed on the display unit, it is possible to easily instruct and input the tracking target.

In an aspect of the present invention, the tracking direction instruction input unit includes icons indicating an up direction, a down direction, a left direction, and a right direction.

According to this aspect, the user can simply instruct and input the tracking direction using icons indicating an up direction, a down direction, a left direction, and a right direction.

An aspect of the present invention relates to a camera system comprising the above imaging control device and a camera.

An aspect of the present invention relates to a camera, comprising: an imaging unit including an imaging lens and an imaging element; a pan and tilt mechanism capable of rotating the imaging unit in a pan direction and a tilt direction; a pan and tilt driving unit that drives the pan and tilt mechanism; a motion vector calculation unit that calculates a motion vector of a tracking target on the basis of a moving image obtained by the imaging unit; a tracking direction instruction input unit that receives an input of an instruction indicating a specific tracking direction for tracking the tracking target; a tracking direction motion component extraction unit that extracts a motion component in the specific tracking direction from the motion vector of the tracking target on the basis of the input instruction; and a drive information generation unit that generates drive information of only the specific tracking direction on the basis of the extracted motion component in the specific tracking direction. An aspect of receiving "an input of an instruction" includes an aspect of receiving the input through communication and an aspect of directly receiving a user operation, and the present invention includes the two aspects.

An aspect of the present invention relates to an imaging control method of controlling a camera including an imaging unit including an imaging lens and an imaging element, a pan and tilt mechanism capable of rotating the imaging unit in a pan direction and a tilt direction, and a pan and tilt driving unit that drives the pan and tilt mechanism, the imaging control method comprising: a motion vector calculation step of calculates a motion vector of a tracking target on the basis of a moving image obtained by the camera; a tracking direction instruction input step of receiving an input of an instruction indicating a specific tracking direction for tracking the tracking target; a tracking direction motion component extraction step of extracting a motion component in the specific tracking direction from the motion vector of the tracking target on the basis of the input instruction; and a drive information generation step of generating drive information of only the specific tracking direction on the basis of the extracted motion component in the specific tracking direction.

An aspect of the present invention relates to a program that controls a camera including an imaging unit including an imaging lens and an imaging element, a pan and tilt mechanism capable of rotating the imaging unit in a pan direction and a tilt direction, and a pan and tilt driving unit that drives the pan and tilt mechanism, the program causing a computer to execute: a motion vector calculation step of calculates a motion vector of a tracking target on the basis of a moving image obtained by the camera; a tracking direction instruction input step of receiving an input of an instruction indicating a specific tracking direction for tracking the tracking target; a tracking direction motion component extraction step of extracting a motion component in the specific tracking direction from the motion vector of the tracking target on the basis of the input instruction; and a drive information generation step of generating drive information of only the specific tracking direction on the basis of the extracted motion component in the specific tracking direction. A computer-readable non-transitory storage medium having this program recorded thereon is also included in an aspect of the present invention.

According to the present invention, in a case where a subject is tracked using a camera capable of rotating an imaging unit in a pan direction and a tilt direction, the rotation speed of the camera can be appropriately adjusted with good follow-up according to the movement speed of the subject through a simple operation, and a tracking image that is easy to view and does not cause fatigue can be displayed.

DESCRIPTION OF THE PREFERRED EMBODIMENTS

Hereinafter, an embodiment of the present invention will be described with reference to the drawings.

[Example of Appearance of Pan and Tilt Camera and Smartphone]

Figure 1:
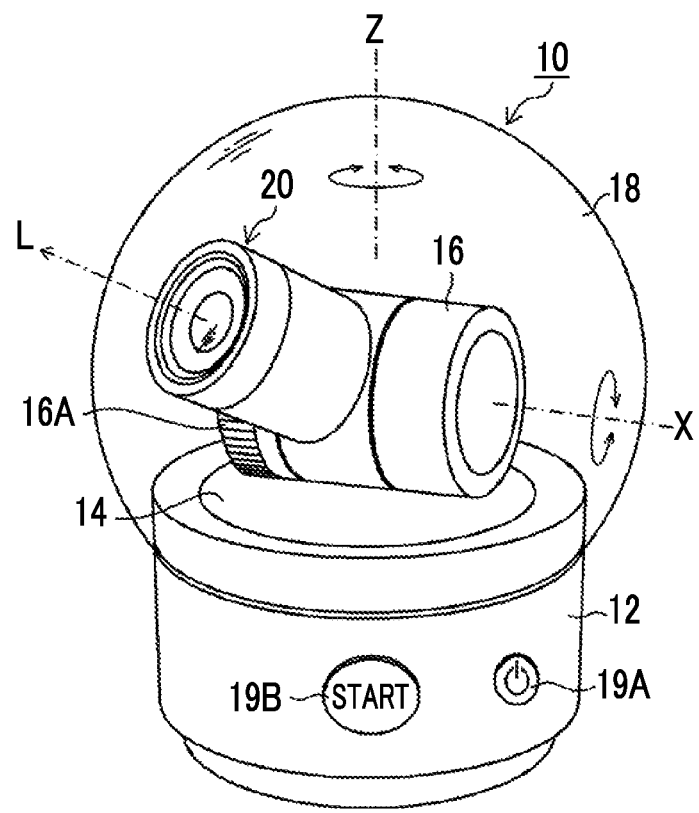
FIG. 1 is a perspective view illustrating an appearance of an example of a pan and tilt camera and a smartphone.
Figure 1:
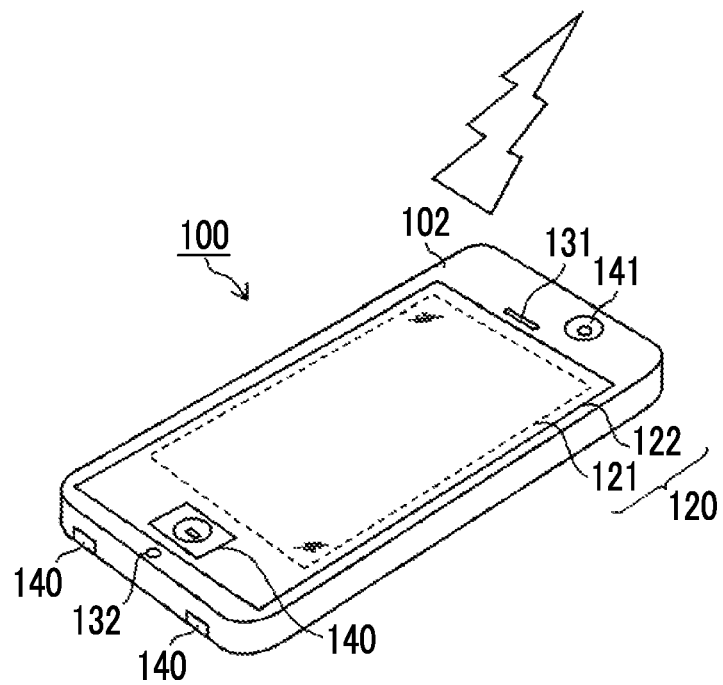

As illustrated in FIG. 1 (a perspective view illustrating an example of a pan and tilt camera system including a pan and tilt camera 10 and a smartphone 100), the pan and tilt camera 10 includes an device body 12, a pedestal 14, a holding unit 16 that is fixed to the pedestal 14 and rotatably holds the imaging unit 20, a dome cover 18 that covers the imaging unit 20, and an imaging unit 20.

Figure 2:
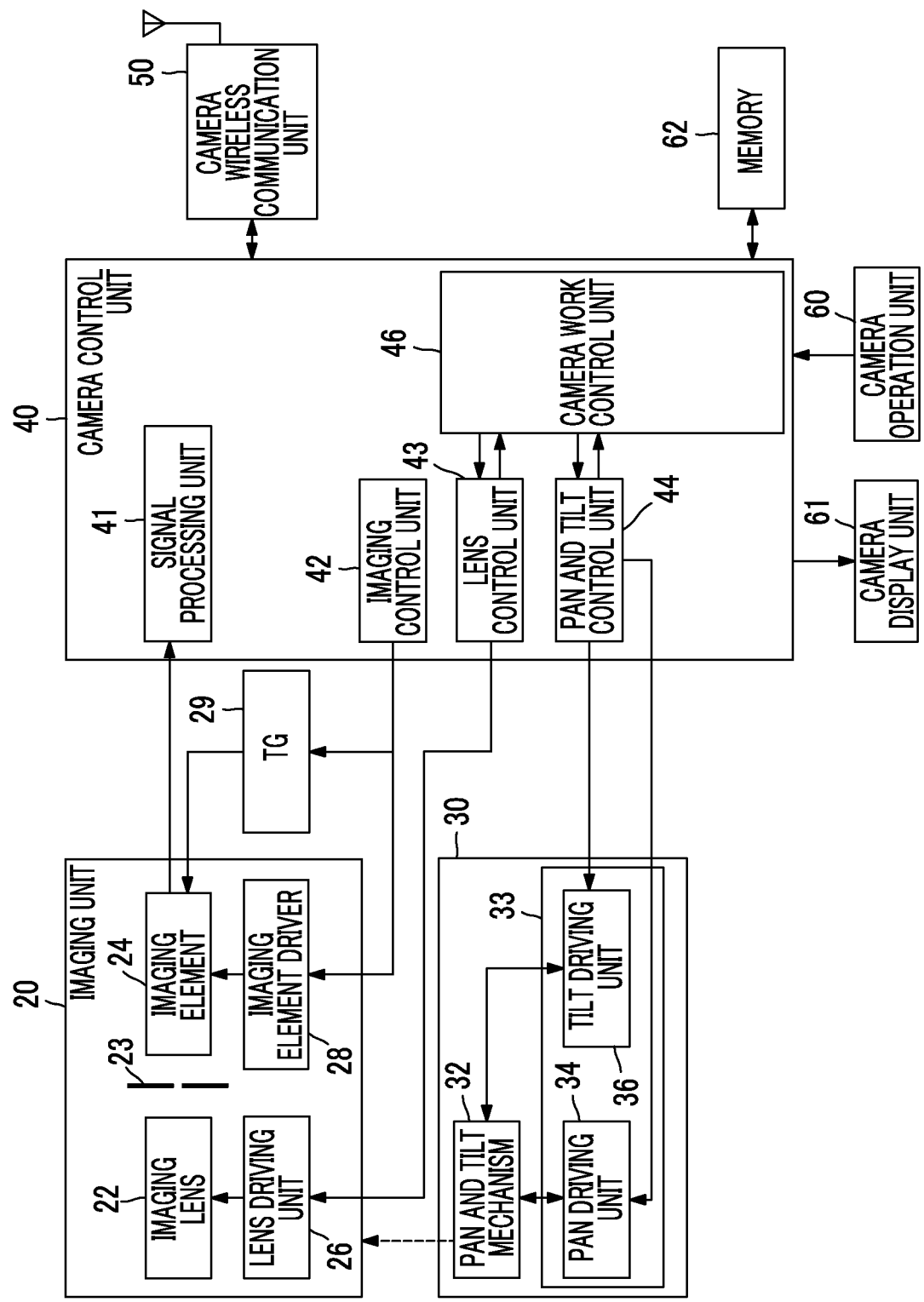
FIG. 2 is a block diagram illustrating an internal configuration of an example of the pan and tilt camera.

The pedestal 14 is disposed to be rotatable about an axis in a vertical direction Z of the device body 12, and rotates about the axis in the vertical direction Z by a pan driving unit 34 (FIG. 2).

A holding unit 16 includes a gear 16A provided on the same axis as an axis in a horizontal direction X, and rotates the imaging unit 20 in up and down directions (tilt operation) according to a driving force delivered from a tilt driving unit 36 (FIG. 2) via the gear 16A.

The dome cover 18 is a dust-proof and drip-proof cover, and has, preferably, a spherical shell shape having a constant thickness, in which an intersection between the axis in the horizontal direction X and the axis in the vertical direction Z is a center of curvature so that optical performance of the imaging unit 20 does not change regardless of an optical axis direction L of the imaging unit 20.

Further, it is preferable for a tripod mounting unit (for example, tripod screw hole; not shown) to be provided on a back surface of the device body 12.

A power switch 19A and an imaging start button 19B for instructing start of imaging are provided in the pan and tilt camera 10, but the pan and tilt camera 10 includes a camera wireless communication unit 50 (FIG. 2) so that various instruction inputs for operations are applied from, mainly, an external terminal (in this example, smartphone) 100 through wireless communication with the smartphone 100.

[Internal Configuration Example of Pan and Tilt Camera]

FIG. 2 is a block diagram illustrating an embodiment of an internal configuration of the pan and tilt camera 10.

This pan and tilt camera 10 can perform imaging of normal still images and moving images. The pan and tilt camera 10 roughly includes the imaging unit 20, a pan and tilt device 30, a camera control unit 40, and a camera wireless communication unit 50.

The imaging unit 20 includes, for example, an imaging lens 22, and an imaging element 24. The imaging lens 22 includes a monofocal lens or a zoom lens, and causes a subject image to be formed on an imaging surface of the imaging element 24. A focus lens, a variable magnification lens (in the case of the zoom lens), and a diaphragm 23 included in the imaging lens 22 are driven by a lens driving unit 26.

The imaging element 24 in this example is a color imaging element in which primary color filters of three primary colors including red (R), green (G), and blue (B) are arranged in a predetermined pattern (for example, a Bayer array, G stripe R/G full checkered, an X-Trans (registered trademark) array, or a honeycomb arrangement) for each pixel, and includes a complementary metal oxide semiconductor (CMOS) image sensor. The imaging element 24 is not limited to the CMOS image sensor, may be a charge coupled device (CCD) image sensor.

The imaging element 24 is driven by an imaging element driver 28 including, for example, a vertical driver and a horizontal driver, and a timing generator (TG) 29. A pixel signal according to the amount of incident light of subject light (digital signal corresponding to signal charge accumulated in each pixel) is read from the imaging element 24.

The pan and tilt device 30 includes, for example, a pan mechanism that rotates the imaging unit 20 in a horizontal direction (pan direction) relative to the device body 12 and a tilt mechanism that rotates the imaging unit 20 in a vertical direction (tilt direction) (hereinafter referred to as a "pan and tilt mechanism") 32, as illustrated in FIG. 1, the pan driving unit 34, and the tilt driving unit 36.

The pan and tilt mechanism 32 is capable of rotating the imaging unit 20 in the pan direction and the tilt direction, and includes a home position sensor that detects a reference position of a rotation angle (pan angle) in the pan direction, and a home position sensor that detects a reference position of a tilt angle in the tilt direction.

Figure 3A:
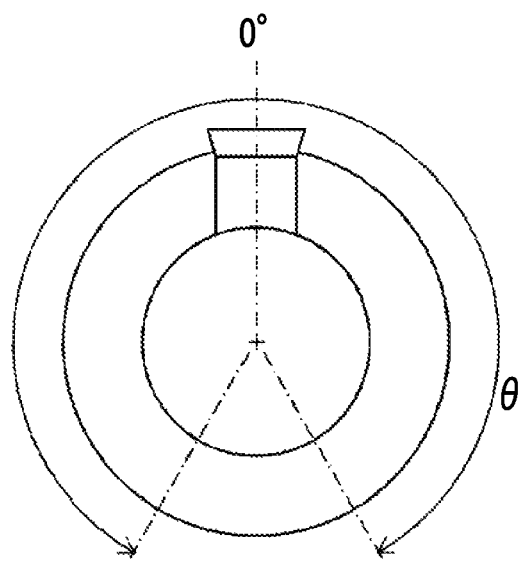
FIG. 3A is a plan view of the pan and tilt camera used for description of rotation in a pan direction.
Figure 3B:
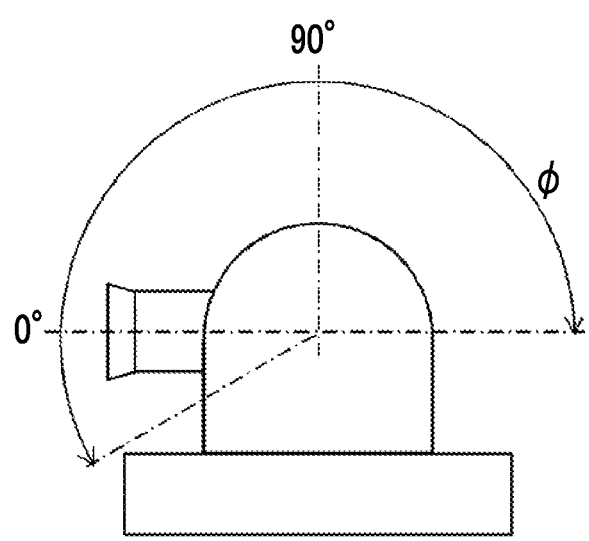
FIG. 3B is a side view of the pan and tilt camera used for description of rotation in a tilt direction.

FIG. 3A is a plan view of the pan and tilt camera 10 illustrating a rotation angle θ in a pan direction. FIG. 3B is a side view of the pan and tilt camera 10 illustrating a rotation angle φ in a tilt direction.

Each of the pan driving unit 34 and the tilt driving unit 36 includes a stepping motor and a motor driver, and outputs a driving force to a pan and tilt mechanism 32 to drive the pan and tilt mechanism 32. The pan driving unit 34 and the tilt driving unit 36 are hereinafter referred to as a pan and tilt driving unit 33.

The camera control unit 40 mainly includes a signal processing unit 41, an imaging control unit 42, a lens control unit 43, a pan and tilt control unit 44, and a camera work control unit 46.

The signal processing unit 41 performs signal processing such as offset processing, a gain control process including white balance correction and sensitivity correction, a gamma correction process, demosaic processing (demosaicing processing), or an RGB/YC conversion process on a digital image signal input from the imaging unit 20. Here, the demosaic processing is a process of calculating all of color information for each pixel from a mosaic image corresponding to a color filter array of a single-plate color imaging element, and is also referred to as a synchronization process. For example, in the case of an imaging element including color filters for three colors RGB, the demosaic processing is a process of calculating color information of all of RGB for each pixel from a mosaic image including RGB. Further, the RGB/YC conversion process is a process of generating luminance data Y and chrominance data Cb and Cr from RGB image data subjected to de-mosaic processing.

The imaging control unit 42 is a unit that instructs, for example, discharge of charges accumulated in a capacitor of each pixel of the imaging element 24 or reading of a signal corresponding to the charges accumulated in the capacitor via the imaging element driver 28 and the TG 29, and performs imaging control in the time-lapse imaging or the like.

The lens control unit 43 is a unit that controls the focus lens, the variable magnification lens, and the diaphragm 23 included in the imaging lens 22 via the lens driving unit 26, and performs, for example, autofocus (AF) control to move the focus lens to a focusing position. The AF control is performed by integrating an absolute value of a high-frequency component of a digital signal corresponding to an AF region, detecting a focusing position in which the integrated value (AF evaluation value) is maximized, and moving the focus lens to the detected focusing position.

The pan and tilt control unit 44 is a unit that controls the pan and tilt device 30.

The camera work control unit 46 outputs instruction signals for controlling the lens control unit 43 and the pan and tilt control unit 44.

The camera wireless communication unit 50 is a unit that performs wireless communication with an external terminal such as the smartphone 100 illustrated in FIG. 1, and receives various instruction inputs for operations from the smartphone 100 through wireless communication. Further, the camera wireless communication unit 50 transmits the captured image or the like to the smartphone 100. The camera wireless communication unit 50 can transmit an image (live view image) captured by the imaging unit 20 and processed by the signal processing unit 41 to the smartphone 100. Thus, it is possible to record the image for recording such as a video in a recording medium inside or outside the smartphone 100 or display the live view image on the display unit of the smartphone 100.

The camera operation unit 60 includes, for example, the imaging start button 19B (FIG. 1) and the power switch 19A (FIG. 1) provided in the device body 12, and can perform an instruction input for the same operation as an instruction input for an operation from the smartphone 100.

The camera display unit 61 functions as an image display unit that displays a live view image, a played image, or the like, and functions as a user interface (UI unit) for displaying a menu screen and setting and inputting various parameters in cooperation with the camera operation unit 60.

The memory 62 includes, for example, a synchronous dynamic random access memory (SDRAM) including a storage region that temporarily stores sequentially captured images, and a work region in which various calculation processes are performed, or a read only memory (ROM) in which, for example, a program for imaging and various data necessary for control are stored.

[Example of Internal Configuration of Smartphone]

Figure 4:
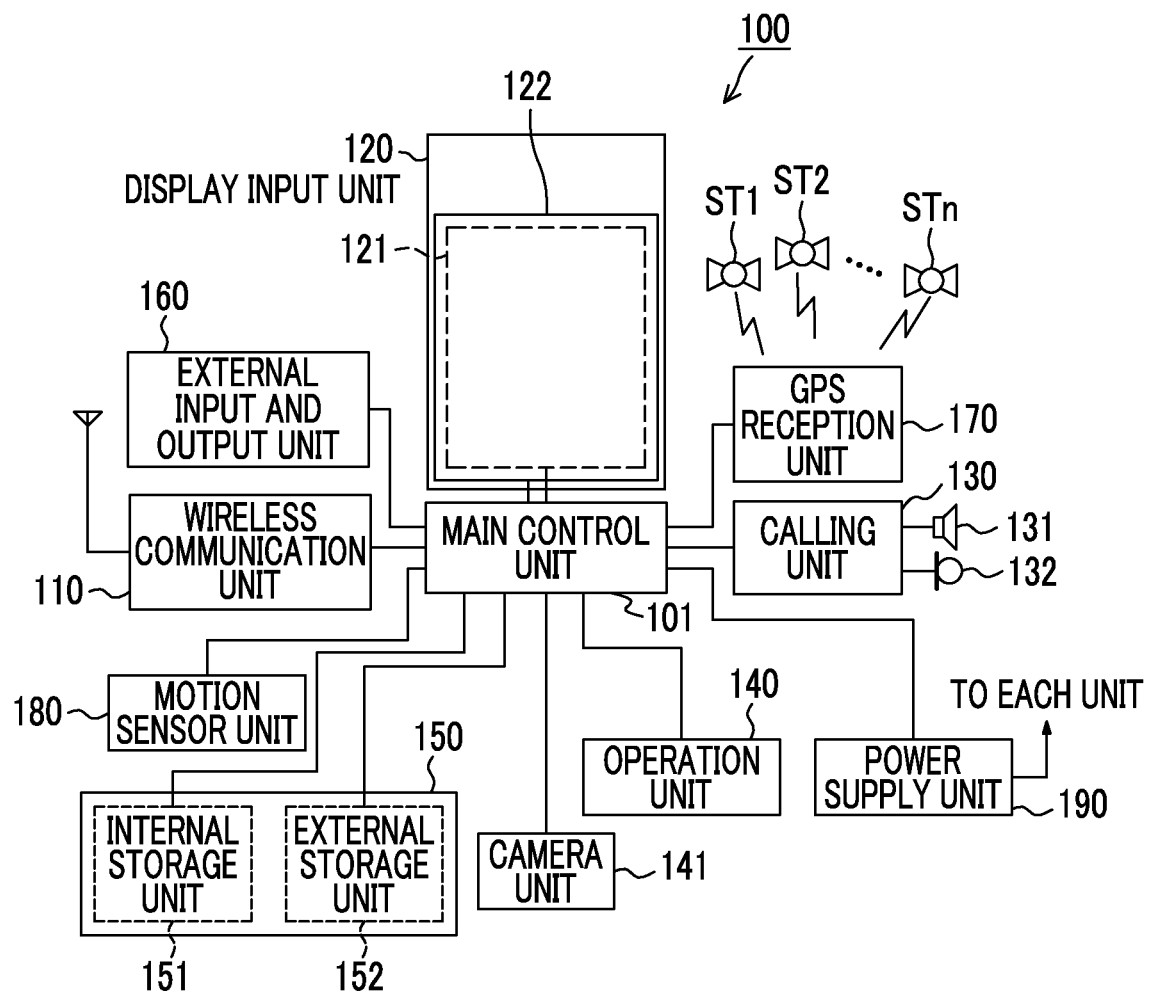
FIG. 4 is a block diagram illustrating an internal configuration of an example of a smartphone.

FIG. 4 is a block diagram illustrating a configuration of the smartphone 100 illustrated in FIG. 1.

As illustrated in FIG. 4, main components of the smartphone 100 include a wireless communication unit 110, a display and input unit 120, a calling unit 130, an operation unit 140, a camera unit 141, a storage unit 150, an external input and output unit 160, a global positioning system (GPS)

reception unit 170, a motion sensor unit 180, a power supply unit 190, and a main control unit 101. Further, a main function of the smartphone 100 includes a wireless communication function of performing mobile wireless communication via a base station device BS and a mobile communication network NW.

The wireless communication unit 110 performs wireless communication with the base station device BS accommodated in the mobile communication network NW according to an instruction of the main control unit 101. Using this wireless communication, transmission and reception of various types of file data such as audio data and image data, e-mail data, or the like, or reception of web data, streaming data, or the like is performed. In this example, the wireless communication unit 110 of the smartphone 100 transmits an instruction input for various operations to the pan and tilt camera 10, or receives a live view image, an image for recording, or the like from the pan and tilt camera 10.

The display and input unit 120 is a so-called touch panel that displays an image (a still image and an moving image) text information, or the like to visually deliver information to a user under the main control unit 101, and detects a user operation for the displayed information. The display and input unit 120 includes a display panel 121 and an operation panel 122. In a case in which a 3D image is viewed, it is preferable for the display panel 121 to be a 3D display panel.

The display panel 121 uses a liquid crystal display (LCD), an organic electro-Luminescence display (OELD), or the like as a display device.

The operation panel 122 is a device that is placed so that an image displayed on a display surface of the display panel 121 can be viewed, and detects one or a plurality of coordinates operated by a finger of a user or a stylus. If this device is operated by the finger of the user or the stylus, the operation panel 122 outputs a detection signal generated by the operation to the main control unit 101. Then, the main control unit 101 detects an operation position (coordinates) on the display panel 121 based on the received detection signal.

As illustrated in FIG. 1, the display panel 121 and the operation panel 122 of the smartphone 100 are integrally formed to constitute a display and input unit 120, but the operation panel 122 is arranged to completely cover the display panel 121. In a case in which this arrangement is adopted, the operation panel 122 may also have a function of detecting a user operation for a region other than the display panel 121. In other words, the operation panel 122 may include a detection region (hereinafter referred to as a display region) for an overlapping portion which overlaps the display panel 121, and a detection region (hereinafter referred to as a non-display region) for an outer edge portion which does not overlap the display panel 121, other than the display region.

A size of the display region and a size of the display panel 121 may completely match, but do not need to necessarily match. Further, the operation panel 122 may include two sensitive regions including the outer edge portion and an inner portion other than the outer edge portion. Further, a width of the outer edge portion may be appropriately designed according to, for example, a size of a housing 102. Further, a position detection scheme adopted in the operation panel 122 may include a matrix switch scheme, a resistive film scheme, a surface acoustic wave scheme, an infrared scheme, an electromagnetic induction scheme, a capacitive scheme, and the like, and any one of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the display and input unit 120 is provided.

The operation unit 140 is a hardware key using a key switch or the like, and receives an instruction from the user. For example, the operation unit 140 is mounted on a lower surface in a lower portion in a display portion of the housing 102 of the smartphone 100, and is a push button switch that is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. Further, the storage unit 150 includes an internal storage unit 151 built in the smartphone and an external storage unit 152 having a slot for an external memory that is detachable. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module (SIM)/user identity module (UIM) card connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wireless connected PDA, and an earphone. The external input-output unit can transfer data received from such an external device to each component inside the smartphone 100, or send internal data of the smartphone 100 to the external device.

The GPS reception unit 170 receives GPS signals that are transmitted from GPS satellites ST1 to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a three-axis acceleration sensor, and detects a physical motion of the smartphone 100 according to an instruction of the main control unit 101. By detecting the physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function includes an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying an image on the display and input unit 120 based on image data (data of a still image or a moving image) such as received data or downloaded streaming data. The image processing function refers to a function of the main control unit 101 decoding the image data, performing image processing on a result of the decoding, and displaying the image on the display and input unit 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display region of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion that overlaps the display panel 121 (display region) or the other outer edge portion (non-display region) that does not overlap the display panel 121, and controlling the sensitive region of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD). Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101. In the smartphone 100 illustrated in FIG. 1, the camera unit 141 is mounted on the same surface as the display and input unit 120, but a mounting position of the camera unit 141 is not limited thereto and may be mounted on a back surface of the display and input unit 120. Alternatively, a plurality of camera units 141 may be mounted. In a case in which the plurality of camera units 141 are mounted, switching to the camera unit 141 provided for imaging may be performed and imaging may be performed using only such a camera unit 141, or imaging may be performed using the plurality of camera units 141 at the same time. Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using the 3-axis acceleration sensor, or in combination with the 3-axis acceleration sensor. Of course, the image from the camera unit 141 can also be used within the application software.

In this example, by downloading application software for operating the pan and tilt camera 10 over a network or the like, storing the application software in the storage unit 150, and operating the main control unit 101 according to the downloaded application software using the application processing function of the smartphone 100, the general-purpose smartphone 100 functions as a user interface (UI unit) for operating the pan and tilt camera 10.

First Embodiment

In the first embodiment, calculation of the motion vector of the tracking target, extraction of the motion component in the tracking direction, and generation of the drive information are performed in the smartphone 100. The generated drive information is output from the smartphone 100 to the pan and tilt camera 10. Further, in the following example, the input of an instruction of the tracking target and the input of the instruction of the tracking direction are received from the user by the display and input unit 120.

Figure 5:
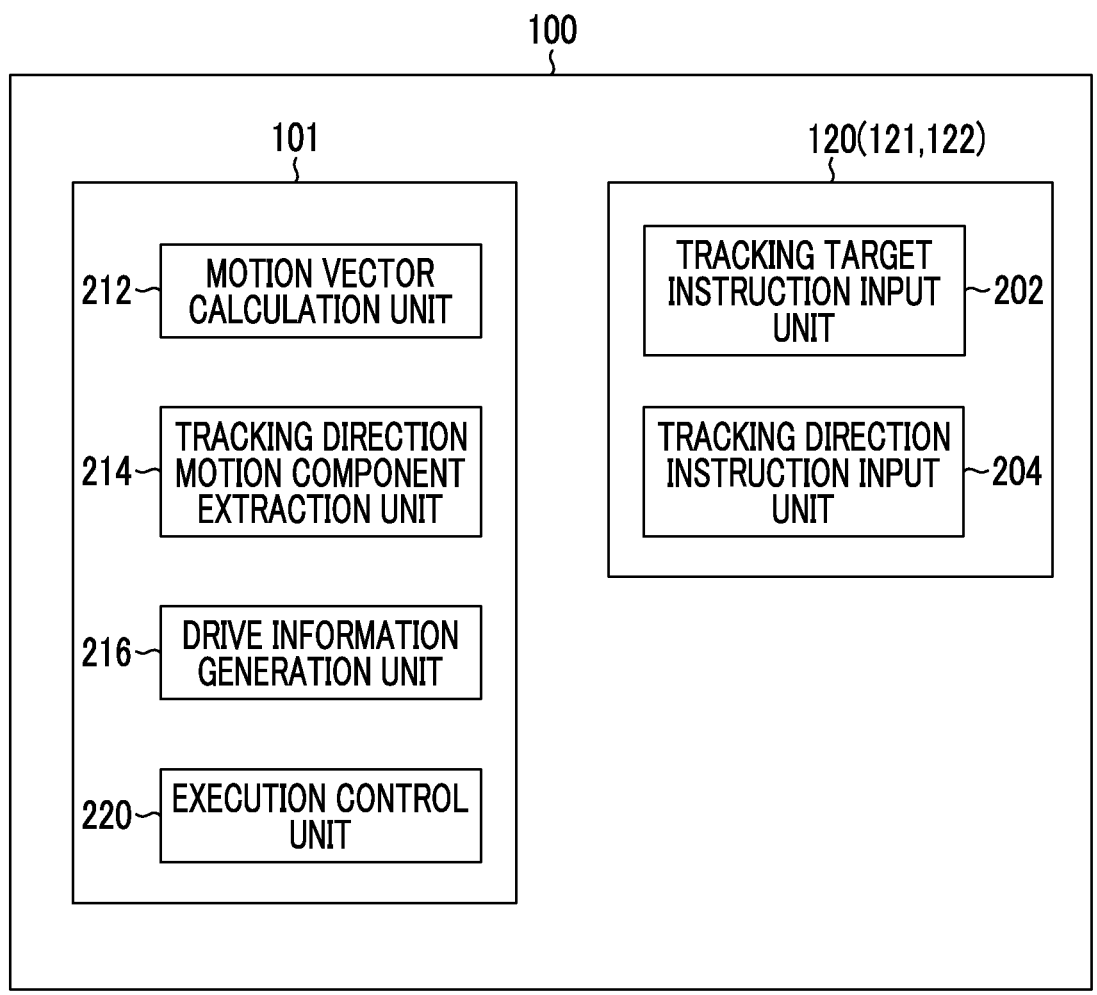
FIG. 5 is a block diagram illustrating an internal configuration example of main units in a first embodiment.

FIG. 5 is a block diagram illustrating an internal configuration example of main units in the first embodiment.

The display and input unit 120 of the smartphone 100 has a configuration in which the display panel 121 (which is an aspect of the display unit) and the operation panel 122 are arranged in a stacked manner, as described with reference to FIG. 1. The display and input unit 120 is used as tracking target instruction input unit 202 that receives an input of an instruction of a tracking target in the image displayed on the display panel 121, and a tracking direction instruction input unit 204 that receives an input of a tracking direction instruction for instructing a specific tracking direction for tracking the tracking target.

The main control unit 101 of the smartphone 100 includes a motion vector calculation unit 212 that calculates a motion vector of the tracking target on the basis of a moving image obtained by the imaging unit 20 of the pan and tilt camera 10, a tracking direction motion component extraction unit 214 that extracts a motion component in a specific tracking direction from the motion vector of the tracking target on the basis of the tracking direction instruction received by the tracking direction instruction input unit 204, a drive information generation unit 216 that generates drive information only for a specific tracking direction on the basis of the extracted motion component in the specific tracking direction, and an execution control unit 220 that controls the execution of each unit of the smartphone 100 according to the program stored in the storage unit (150 in FIG. 4).

Figure 6:
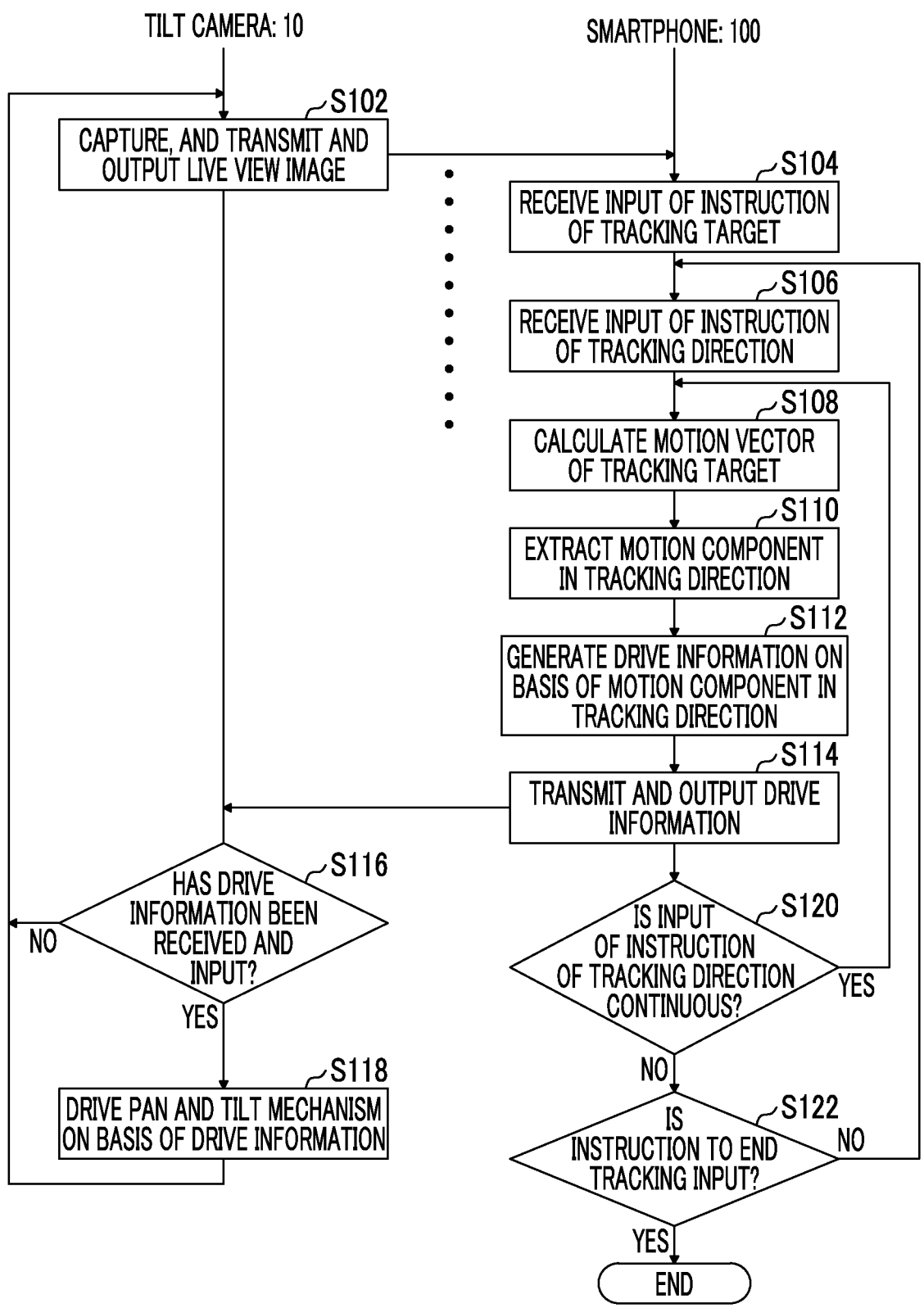
FIG. 6 is a flowchart illustrating a flow of an example of a tracking process in the first embodiment.

FIG. 6 is a flowchart illustrating an example of an imaging control method in the first embodiment. In FIG. 6, the process of the smartphone 100 is executed according to a program stored in the storage unit 150 of the smartphone 100 by the execution control unit 220 of the smartphone 100. The process of the pan and tilt camera 10 is executed according to a program stored in the memory 62 of the pan and tilt camera 10 by the camera control unit 40 of the pan and tilt camera 10.

It is assumed that the pan and tilt camera 10 is in a state in which the power switch 19A and the imaging start button 19B have already been turned on, and initialization of the pan and tilt mechanism 32, the pan and tilt driving unit 33, and the like have ended, and imaging of the subject has started.

The pan and tilt camera 10 transmits and outputs the live view image captured by the imaging unit 20 to the smartphone 100 using the camera wireless communication unit 50 under the control of the camera control unit 40 (step S102). The smartphone 100 receives the live view image using the wireless communication unit 110 and displays the live view image on the display panel 121 of the display and input unit 120.

The pan and tilt camera 10 of this example performs capturing of a live view image at regular time intervals and transmits and outputs the live view image to the smartphone 100 at regular time intervals. Here, the "regular time intervals" are not limited to completely the same time intervals, but includes a case where fluctuation within a certain allowable range occurs. Further, the present invention is not limited to a case where imaging time intervals and transmission time intervals of the live view image are regular. The pan and tilt camera 10 may perform capturing and transmission output of the live view imaging at undefined time intervals according to a load state of each unit of the pan and tilt camera 10, a communication environment, or the like. For example, in a case where it is detected that a change amount of the captured image is equal to or less than a threshold value, in a case where it is detected that a load of a process in the pan and tilt camera 10 is out of an allowable range, or in a case where the communication environment is out of an allowable range, at least one of the imaging and the transmission may be temporarily stopped. Further, since imaging time information (so-called time stamp) is added to the live view image, the smartphone 100 can detect the imaging time from the imaging time information added to the live view image.

Figure 7:
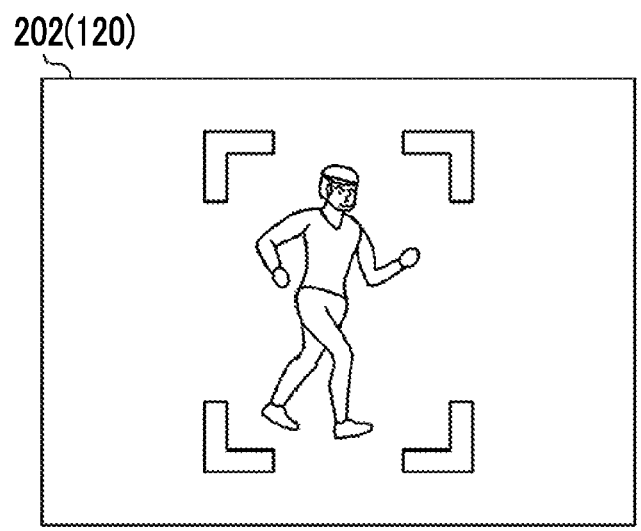
FIG. 7 is an illustrative diagram that is used for description of an input of an instruction of a tracking target and motion vector calculation.
Figure 7:
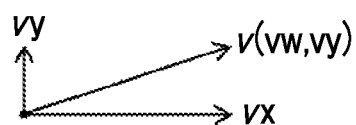

In the smartphone 100, as illustrated in FIG. 7, the display and input unit 120 functioning as the tracking target instruction input unit 202 receives the input of the instruction of the tracking target in the displayed live view image (step S104: an aspect of a tracking target instruction input step). In this example, the operation panel 122 constituting the display and input unit 120 directly receives the input of the instruction of the tracking target from the user. For example, in a case where a person is instructed and input as the tracking target, the tracking target is instructed and input by performing a touch input to tap an image of the person in the live view image with a finger or the like. The input of the instruction of the tracking target may be received through a touch input to draw a trajectory with a finger or the like to surround the image of the person or to perform multi-tapping with a plurality of fingers to pinch the image of the person.

Figure 8:
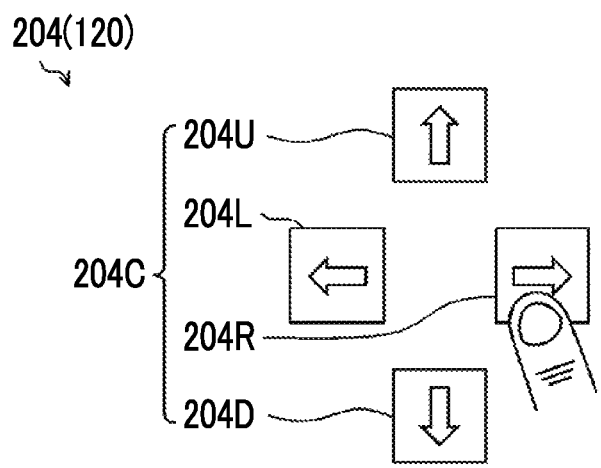
FIG. 8 is an illustrative diagram that is used for description of an input of an instruction of a tracking direction.
Figure 9:
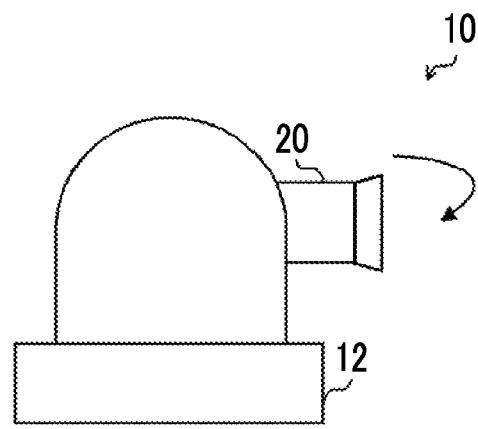
FIG. 9 is an illustrative diagram that is used for description of tracking using an imaging unit of a pan and tilt camera.

Further, in the smartphone 100, as illustrated in FIG. 8, the display and input unit 120 functioning as the tracking direction instruction input unit 204 receives an input of a tracking direction instruction indicating a specific tracking direction in which the tracking target is tracked (step S106: an aspect of a tracking direction instruction input step). In this example, the operation panel 122 constituting the display and input unit 120 directly receives the input of the instruction of the tracking direction from the user. In FIG. 8, the tracking direction instruction input unit 204 is configured with the cross key 204C. The cross key 204C includes an icon 204U (hereinafter referred to as an "up key") indicating an up direction, an icon 204D (hereinafter referred to as a "down key") indicating a down direction, an icon 204L (hereinafter referred to as a "left key") indicating a left direction, and an icon 204R (hereinafter referred to as a "right key") indicating a right direction. Pressing of the left key 204L corresponds to a counterclockwise rotation in the pan direction of the imaging unit 20 in the pan and tilt camera 10, as illustrated in FIG. 9, in the case of a camera posture in FIG. 1. Pressing of the right key 204R corresponds to a clockwise rotation in the pan direction of the imaging unit 20 in the pan and tilt camera 10 in the case of the camera posture. Pressing of the up key 204U corresponds to a clockwise rotation in the tilt direction of the imaging unit 20 in the pan and tilt camera 10 in the case of the camera posture. Pressing of the down key 204D corresponds to a counterclockwise rotation in the tilt direction of the imaging unit 20 in the pan and tilt camera 10 in the case of the camera posture. That is, the tracking direction instruction input unit 204 receives an input of an instruction of any one of the pan direction and the tilt direction. However, since a correspondence relationship between the pressing of each key in the cross key 204C and the direction of the rotation of the imaging unit 20 in the pan and tilt camera 10 is different according to the posture (for example, upward posture, downward posture, and horizontal posture) of the pan and tilt camera 10, a correspondence relationship between each key of the cross key 204C and the rotational direction of the imaging unit 20 is changed according to the posture of the pan and tilt camera 10 in a case where the pan and tilt camera 10 can take various postures (in a case where the pan and tilt camera 10 is a portable type rather than an installation type).

The pan and tilt camera 10 repeats the imaging and the transmission output of the live view image. In the smartphone 100, when the live view image is received, the live view image is displayed on the display panel 121 of the display and input unit 120.

The motion vector calculation unit 212 of the smartphone 100 calculates the motion vector v of the tracking target on the basis of a plurality of live view images (which are moving images) (step S108: an aspect of a motion vector calculation step). For example, in the live view image illustrated in FIG. 7, a motion vector v of an image of a person who is a tracking target includes a horizontal component vx and a vertical component vy.

The tracking direction motion component extraction unit 214 of the smartphone 100 extracts the motion component in the specific tracking direction from the motion vector v of the tracking target on the basis of the tracking direction instruction (step S110: an aspect of the tracking direction motion component extraction step). In a case where only the right key 204R is pressed as illustrated in FIG. 8, only the motion component in the right direction is extracted. In a case where only the left key 204L is pressed, only the motion component in a left direction is extracted. In a case where only the up key 204U is pressed, only the motion component in the up direction is extracted. In a case where only the down key 204D is pressed, only the motion component in the down direction is extracted. In a case where two keys (for example, the up key 204U and the right key 204R) are pressed, motion components in the directions (for example, the up direction and the down direction) corresponding to the pressed keys among the motion components in the up, down, left, and right directions are extracted.

The drive information generation unit 216 of the smartphone 100 generates drive information for only the specific tracking direction on the basis of the extracted motion component in the specific tracking direction (step S112: an aspect of the drive information generation step). In a case where only the right key 204R is pressed as illustrated in FIG. 8, the drive information for only the clockwise rotation of the pan direction is generated in the camera posture of FIG. 1. In a case where only the left key 204L is pressed, the drive information for only the counterclockwise rotation of the pan direction is generated in the camera posture. In a case where only the up key 204U is pressed, the drive information for only the clockwise rotation of the tilt direction is generated in the camera posture. In a case where only the down key 204D is pressed, the drive information for only the counterclockwise rotation of the tilt direction is generated in the camera posture. In a case where two keys (for example, the up key 204U and the right key 204R) are pressed, the drive information for only the directions (for example, the clockwise direction of the pan and the clockwise direction of the tilt) corresponding to the pressed keys among motion components in the up, down, left, and right directions are generated.

The drive information generation unit 216 generates drive information for the next time on the basis of drive information generated in a previous time and the motion component in the specific tracking direction extracted in a state in which the pan and tilt mechanism 32 is driven according to the drive information generated in the previous time. For example, in a case where an angular velocity of the rotation of the imaging unit 20 is generated as the drive information, an angular velocity of the next time is calculated on the basis of the angular velocity generated in the previous time and a motion component in the tracking direction extracted in a state in which the imaging unit 20 is rotated at the velocity generated in the previous time. For example, if a motion component $\Delta vx$ in a right direction is extracted on the live view image when an angular velocity of a clockwise rotation in the pan direction of the imaging unit 20 of the pan and tilt camera 10 that follows only a motion in a right direction of an image of a person is vx0 in FIG. 10, an angular velocity vxi $(=vx0+f(\Delta vx))$ of the clockwise rotation in the pan direction of the next time is obtained on the basis of vx0 and $\Delta vx$. Here, f( ) indicates a correspondence relationship between the motion component in the tracking direction in the live view image (a tracking error on the image) and an angular acceleration in the tracking direction of the imaging unit 20 in the pan and tilt camera 10. However, a correspondence relationship between the tracking error on the live view image and the angular acceleration in the tracking direction of the imaging unit 20 in the pan and tilt camera 10 is not particularly limited and may be set appropriately so that the subject can be tracked smoothly.

The generated drive information is transmitted and output to the pan and tilt camera 10 by the wireless communication unit 110 of the smartphone 100 (step S114). The transmitted and output drive information is received and input by the camera wireless communication unit 50 of the pan and tilt camera 10.

The camera control unit 40 of the pan and tilt camera 10 determines whether or not the drive information has been received and input (step S116). When the drive information is received and input (YES in step S116), the camera control unit 40 of the pan and tilt camera 10 drives the pan and tilt mechanism 32 using the pan and tilt driving unit 33 on the basis of the drive information (step S118). That is, the imaging unit 20 of the pan and tilt camera 10 rotates only in the specific tracking direction of the tracking target on the basis of the drive information. For example, the imaging unit 20 of the pan and tilt camera 10 rotates only in a clockwise direction of a pan direction, as illustrated in FIG. 9.

The execution control unit 220 of the smartphone 100 determines whether or not an input of an instruction of the tracking direction to the tracking direction instruction input unit 204 is continuous (step S120).

In a case where the input of the instruction of the tracking direction is continuous (YES in step S120), the process returns to step S108 in which calculation of the motion vector of the tracking target (step S108), extraction of the motion component in the tracking direction (step S110), generation of the drive information (step S112), and transmission output of the drive information (step S114) are repeatedly executed. For example, when the right key 204R of the cross key 204C illustrated in FIG. 8 is continuously pressed, steps S108 to S114 are repeatedly executed under the execution control of the execution control unit 220.

Figure 10:
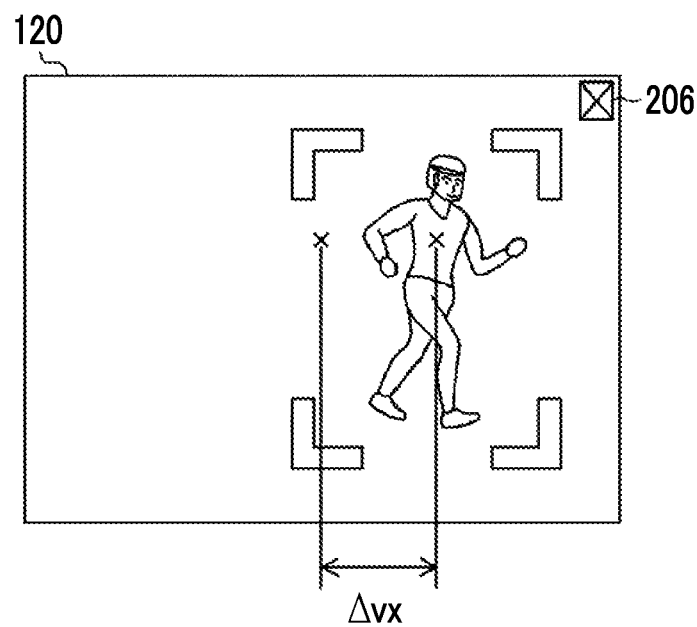
FIG. 10 is an illustrative diagram that is used for description of drive information generation.

If the continuous input of the instruction of the tracking direction ends (NO in step S120), the repetition of steps S108 to S114 ends. For example, when a finger or the like is released from the right key 204R of the cross key 204C illustrated in FIG. 8 and the continuous pressing of the right key 204R ends, the repeated execution of steps S108 to S114 ends and it is determined whether or not an instruction to end the tracking has been input under the execution control of the execution control unit 220 (step S122). For example, in a case where the end key 206 of FIG. 10 is pressed, it is determined that the instruction to end the tracking has been input.

In a case where the instruction to end the tracking has been input (YES in step S122), the tracking ends under execution control of the execution control unit 220. In a case where the instruction to end the tracking has not been input (NO in step S122), the process returns to S106 and reception of the input of the instruction of the tracking direction is performed (step S106), as necessary.

Second Embodiment

In a second embodiment, calculation of a motion vector of a tracking target, extraction of a motion component in a tracking direction, and generation of drive information are performed in the pan and tilt camera 10. Further, in the following example, an instruction of the tracking target and an instruction of the tracking direction are input by being received from the smartphone 100 using the camera wireless communication unit 50.

Figure 11:
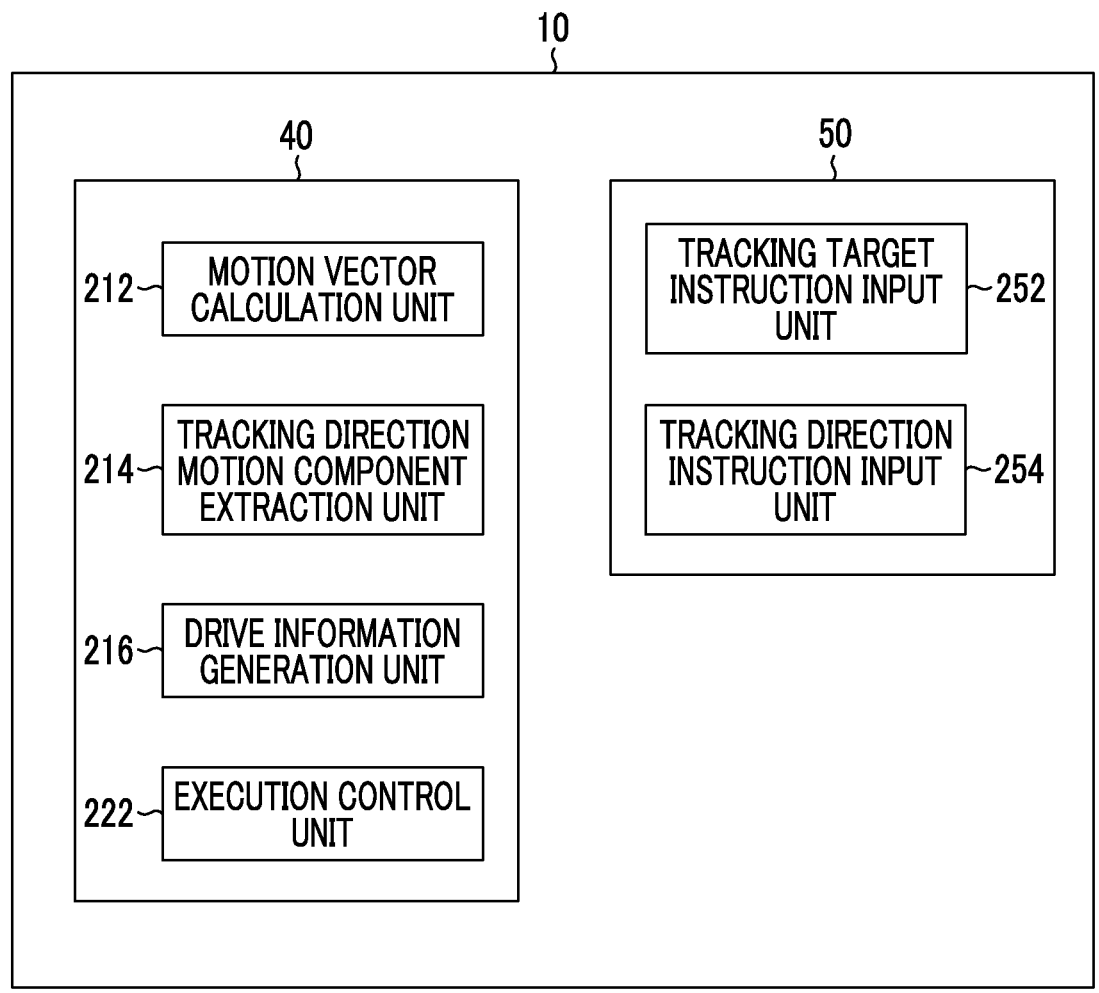
FIG. 11 is a block diagram illustrating an internal configuration example of main units in a second embodiment.

FIG. 11 is a block diagram illustrating an internal configuration example of main units in the second embodiment.

A camera wireless communication unit 50 of the pan and tilt camera 10 includes a tracking target instruction input unit 252 that inputs (receives) an instruction of the tracking target from the smartphone 100 through wireless communication, and a tracking direction instruction input unit 254 that inputs (receives) an instruction of the tracking direction from the smartphone 100 through wireless communication.

In the second embodiment, when a live view image is displayed in the display and input unit 120 of the smartphone 100 and an input operation of an instruction of the tracking target is performed by the user, a position of the tracking target in the live view image is output (transmitted) as an instruction of the tracking target from the smartphone 100 to the pan and tilt camera 10 through wireless communication. The camera wireless communication unit 50 of the pan and tilt camera 10 inputs (receives) the instruction of the tracking target through wireless communication. Further, in the second embodiment, when an input operation of the instruction of the tracking direction is performed in the display and input unit 120 of the smartphone 100, the instruction of the tracking direction is output (transmitted) from the wireless communication unit 110 of the smartphone 100 to the pan and tilt camera 10 through wireless communication. The camera wireless communication unit 50 of the pan and tilt camera 10 inputs (receives) the instruction of the tracking direction through wireless communication.

The camera control unit 40 of the pan and tilt camera 10 includes a motion vector calculation unit 212 that calculates a motion vector of the tracking target on the basis of a moving image obtained by the pan and tilt camera 10, a tracking direction motion component extraction unit 214 that extracts a motion component in a specific tracking direction from the motion vector of the tracking target on the basis of the tracking direction instruction received by the tracking direction instruction input unit 254, a drive information generation unit 216 that generates drive information only for a specific tracking direction on the basis of the extracted motion component in the specific tracking direction, and an execution control unit 222 that controls the execution of each unit of the smartphone 100 according to the program stored in the memory (62 in FIG. 2).

Figure 12:
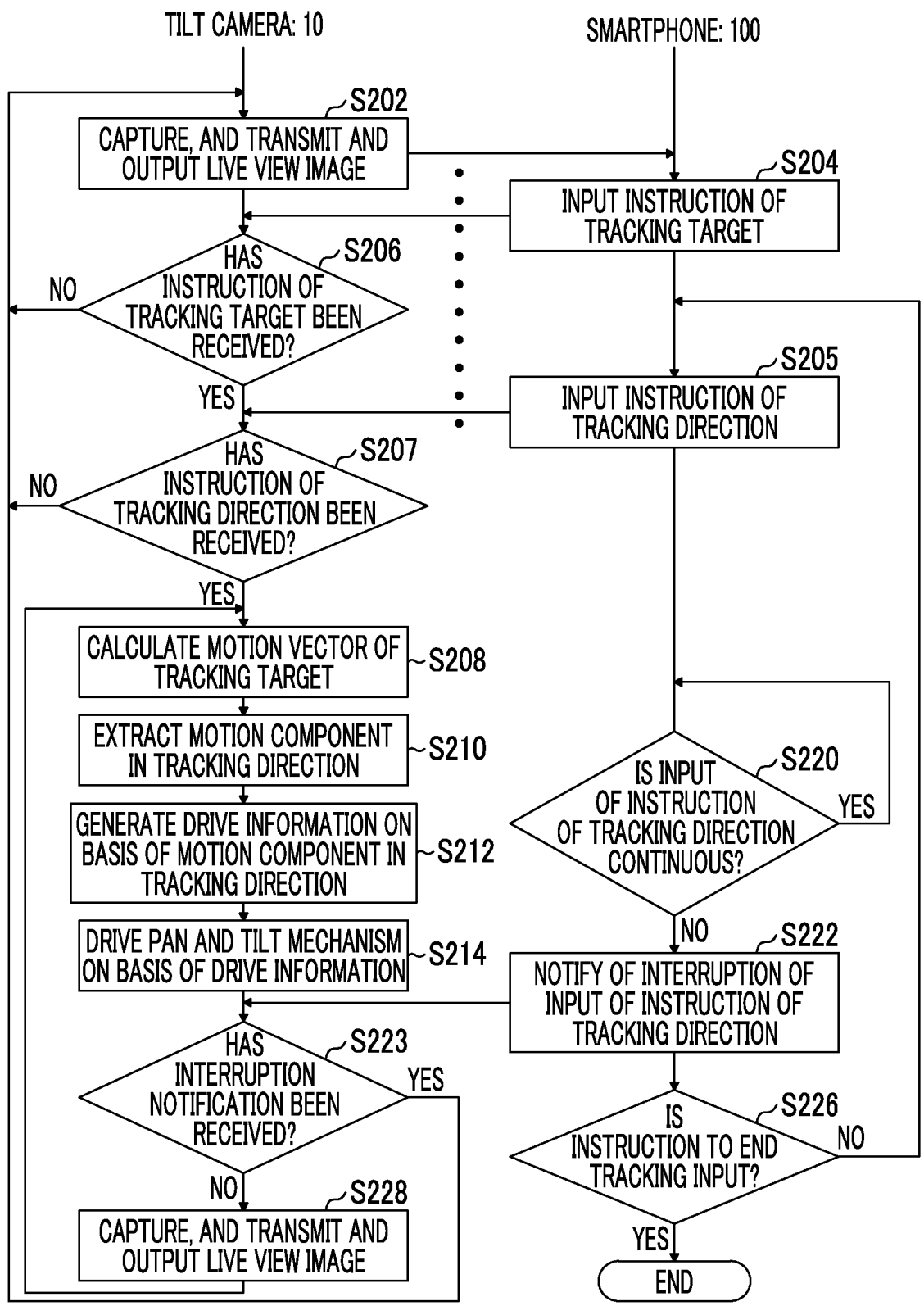
FIG. 12 is a flowchart illustrating a flow of a tracking process in the second embodiment.

FIG. 12 is a flowchart illustrating a flow of an example of an imaging control method in the second embodiment.

It is assumed that the pan and tilt camera 10 is in a state in which a power switch 19A and an imaging start button 19B have already been turned on, and initialization of the pan and tilt mechanism 32, the pan and tilt driving unit 33, and the like have ended, and imaging of the subject has started.

The pan and tilt camera 10 transmits and outputs the live view image captured by an imaging unit 20 to the smartphone 100 using a camera wireless communication unit 50 under the control of the camera control unit 40 (step S202). The smartphone 100 receives the live view image using a wireless communication unit 110 and the display panel 121 of the display and input unit 120 displays the live view image.

In the smartphone 100, an instruction of the tracking target in the live view image displayed on the display and input unit 120 is input to the display and input unit 120, as illustrated in FIG. 7 (step S204). The instruction of the tracking target is transmitted from the smartphone 100 to the pan and tilt camera 10 through wireless communication.

Further, in the smartphone 100, an instruction of the tracking direction is input to the display and input unit 120, as illustrated in FIG. 8 (step S205). The instruction of the tracking direction is transmitted from the smartphone 100 to the pan and tilt camera 10 through wireless communication.

The execution control unit 222 of the pan and tilt camera 10 determines whether the instruction of the tracking target has been input (received) through the wireless communication (step S206) and determinates whether the instruction of the tracking direction has been input (received) through the wireless communication (step S207). Here, the reception of the instruction of the tracking direction corresponds to an aspect of a tracking direction instruction input step.

In a case where the instruction of the tracking target and the instruction of the tracking direction are input (YES in step S206 and YES in step S207), calculation of the motion vector of the tracking target (step S208: an aspect of the motion vector calculation step), extraction of the motion component in the tracking direction (step S210: an aspect of a tracking direction motion component extraction step), and generation of the drive information based on the motion component in the tracking direction (step S212: an aspect of a drive information generation step) are executed in the pan and tilt camera 10 under execution control of the execution control unit 222. The steps S208 to S212 are the same as steps S108 to S112 in the first embodiment, and detailed description thereof will be omitted.

The camera control unit 40 of the pan and tilt camera 10 drives the pan and tilt mechanism 32 using the pan and tilt driving unit 33 on the basis of the drive information (step S214). That is, the imaging unit 20 of the pan and tilt camera 10 rotates only in the specific tracking direction of the tracking target on the basis of the drive information.

The main control unit 101 of the smartphone 100 determines whether or not the input of the instruction of the tracking direction to the display and input unit 120 is continuous (step S220). In a case where the continuous input of the instruction of the tracking direction ends (NO in step S220), interruption of the input of the instruction of the tracking direction is notified (transmitted) from the smartphone 100 to the pan and tilt camera 10 through wireless communication (step S222).

The execution control unit 222 of the pan and tilt camera 10 performs a determination (step S223) as to whether or not the notification of the interruption of the input of the instruction of the tracking direction has been received through wireless communication. In a case where the notification of the interruption has not been received (NO in step S223), that is, in a case where the input of the instruction of the tracking direction is continuous in the smartphone 100, the imaging and the transmission and output of the live view image (step S228) are repeated, and the calculation of the motion vector of the tracking target (step S208), the extraction of the motion component in the tracking direction (step S210), the generation of the drive information (step S212), and the driving of the pan and tilt mechanism (step S214) are repeatedly executed. In a case where the notification of the interruption has been received (YES in step S223), that is, when the continuous input of the instruction of the tracking direction ends in the smartphone 100, the process returns to step S202 and the imaging and the transmission and output of the live view image are repeated until an instruction of a new tracking target is received. In the smartphone 100, it is determined whether there is an input of an instruction to end tracking (step S226). In a case where there is the input of an instruction to end tracking (YES in step S226), the tracking process ends in the smartphone 100.

Although the case in which the tracking target instruction input unit 252 and the tracking direction instruction input unit 254 are configured with the camera wireless communication unit 50 has been described by way of example, the camera operation unit 60 may receive the input of the instruction of the tracking target and the input of the instruction of the tracking direction. That is, a tracking target instruction input unit and a tracking direction instruction input unit are configured with the camera operation unit 60.

Other Embodiments

Although the first embodiment (an aspect in which the motion vector calculation unit 212, the tracking direction motion component extraction unit 214, and the drive information generation unit 216 which are the main units of the present invention are arranged in the smartphone 100) and the second embodiment (an aspect in which the main units are arranged in the pan and tilt camera 10) have been described in detail, the main units may be arranged in devices (for example, a computer device generally called a "server") other than the pan and tilt camera 10 and the smartphone 100. In this case, the imaging control device of the present invention is configured with the server.

Further, the main units (the motion vector calculation unit 212, the tracking direction motion component extraction unit 214, and the drive information generation unit 216) may be distributed and arranged in a plurality of devices. For example, the motion vector calculation unit 212 and the tracking direction motion component extraction unit 214 are arranged in the smartphone 100 (or a server device), and the drive information generation unit 216 is arranged in the pan and tilt camera 10. In this case, the imaging control device of the present invention is configured with the plurality of devices.

[Variation of Input of Instruction of Tracking Direction]

In the above embodiment, the case in which there are limitations: (1) any one of the pan direction (corresponding to the left direction and the right direction of the cross key) and the tilt direction (corresponding to the up direction and the down direction of the cross key) is received as the tracking direction using the cross key including the icons indicating the up direction, the down direction, the left direction, and the right direction, and (2) the calculation of the motion vector of the tracking target, the extraction of the motion component in the tracking direction, and the generation of the drive information are repeatedly performed during the period in which the input of the instruction of the tracking direction is continuous has been described by way of example in order to facilitate understanding of the present invention. However, the present invention may be a case where the above limitations are not present.

Figure 13:
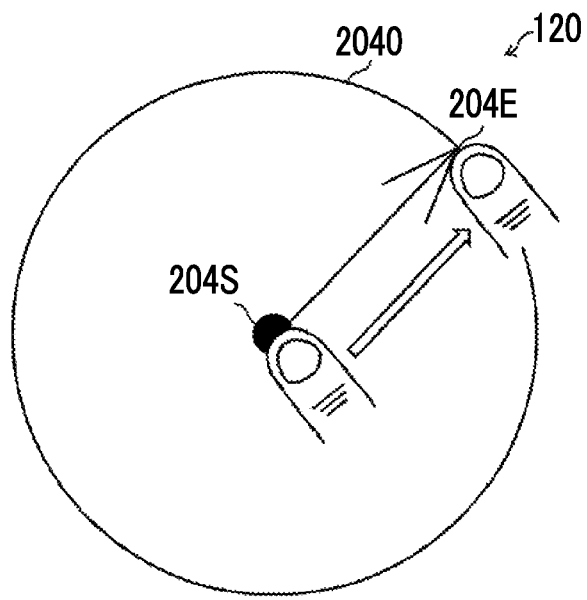
FIG. 13 is an illustrative diagram that is used for description of a variation of a tracking direction instruction input.
Figure 14:
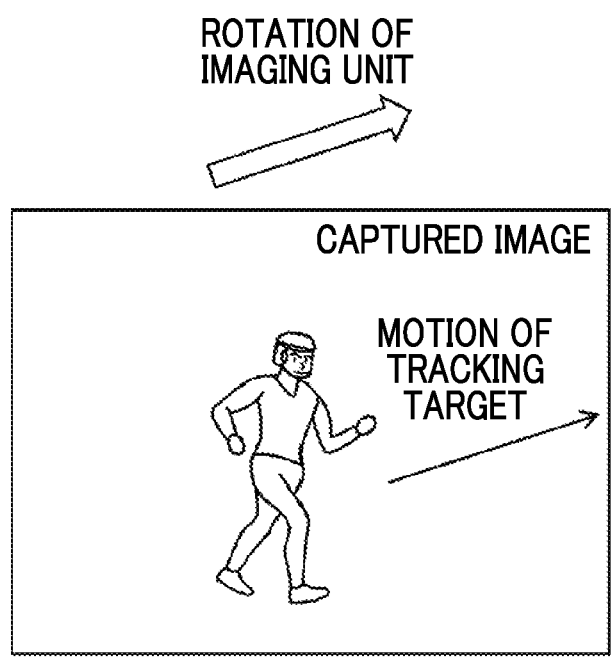
FIG. 14 is an illustrative diagram that is used for description of a problem of the present invention.

First, the tracking direction instruction input unit (204 in FIG. 5) of the smartphone 100 is not limited to the cross key 204C illustrated in FIG. 8 and an input of a direction in which a component in the pan direction and a component in the tilt direction are mixed may be received as the specific tracking direction. For example, as illustrated in FIG. 13, when a circle 2040 and a center point 204S are displayed on the display and input unit 120 of the smartphone 100 and a trajectory is drawn from the center point 204S to an edge of the circle 2040 by a touch of a finger or the like, a direction of a straight line connecting the center point 204S and an end point 204E on the edge of the circle 2040 is received as the tracking direction. In this case, the drive information includes drive information of the pan direction and drive information of the tilt direction, but this embodiment is the same as the first embodiment in that the drive information generation unit 216 generates the received drive information of only the tracking direction.

Second, if an input of an instruction of the tracking direction to the tracking direction instruction input unit 204 is performed once, the calculation of the motion vector of the tracking target in the motion vector calculation unit 212, the extraction of the motion component in the tracking direction in the tracking direction motion component extraction unit 214, and the generation of the drive information in the drive information generation unit 216 may be repeatedly executed until release of the tracking direction with respect to the tracking direction instruction input unit 204 is performed, or until a certain time elapses.

For example, imaging (self-imaging) in which a user who has operated the input of the instruction of the tracking direction is a subject can be performed.

The present invention is not particularly limited to the examples described in this specification and the accompanying drawings, and may be implemented in an aspect different from the examples described in this specification and the accompanying drawings without departing from the gist of the present invention.

EXPLANATION OF REFERENCES

10: pan and tilt camera (imaging control device of second embodiment)
20: imaging unit
22: imaging lens
24: image element
32: pan and tilt mechanism
33: pan and tilt driving unit
100: smartphone (imaging control device of first embodiment)
202, 252: tracking target instruction input unit
204, 254: tracking direction instruction input unit
212: motion vector calculation unit
214: tracking direction motion component extraction unit
216: drive information generation unit
220, 222: execution control unit

What is claimed is:

1. An imaging control device that controls a camera including an imaging unit including an imaging lens and an imaging element, a pan and tilt mechanism capable of rotating the imaging unit in a pan direction and a tilt direction, and a pan and tilt driver that drives the pan and tilt mechanism, the imaging control device comprising:
a processor configured to:
calculate a motion vector of a tracking target on the basis of a moving image obtained by the imaging unit;
receive, via a user interface, an input of a tracking direction instruction indicating a specific tracking direction for tracking the tracking target;

extract a motion component in the specific tracking direction from the motion vector of the tracking target on the basis of the tracking direction instruction; and generate drive information of only the specific tracking direction of the pan and tilt mechanism on the basis of the extracted motion component in the specific tracking direction.

2. The imaging control device according to claim 1, wherein the processor generates drive information for the next time on the basis of drive information generated in a previous time and the motion component in the specific tracking direction extracted in a state in which the pan and tilt mechanism of the camera is driven according to the drive information generated in the previous time.

3. The imaging control device according to claim 1, wherein the calculation of the motion vector of the tracking target, the extraction of the motion component in the tracking direction, and the generation of the drive information are repeatedly performed during a period in which an input of an instruction of the tracking direction via the user interface is continuous.

4. The imaging control device according to claim 1, wherein when an input of an instruction of the tracking direction via the user interface is performed once, the calculation of the motion vector of the tracking target, the extraction of the motion component in the tracking direction, and the generation of the drive information are repeatedly executed until an input of an instruction to release the tracking direction via the user interface is performed or until a certain time elapses.

5. The imaging control device according to claim 1, wherein the processor receives an input of an instruction of any one of the pan direction and the tilt direction as the specific tracking direction via the user interface.

6. The imaging control device according to claim 1, wherein the processor receives an input of a direction in which a component in the pan direction and a component in the tilt direction are mixed, as the specific tracking direction via the user interface.

7. The imaging control device according to claim 1, further comprising:
a display unit that displays a moving image or a still image obtained by the camera;
wherein the processor receives an input of an instruction of the tracking target in the image displayed on the display unit via the user interface.

8. The imaging control device according to claim 1, wherein the user interface includes icons indicating an up direction, a down direction, a left direction, and a right direction.

9. A camera system, comprising:
the imaging control device according to claim 1; and
the camera.

10. A camera, comprising:
an imaging unit including an imaging lens and an imaging element;
a pan and tilt mechanism capable of rotating the imaging unit in a pan direction and a tilt direction;

a pan and tilt driver that drives the pan and tilt mechanism;
calculate a motion vector of a tracking target on the basis of a moving image obtained by the imaging unit;
receive an input of an instruction indicating a specific tracking direction for tracking the tracking target via a user interface;
extract a motion component in the specific tracking direction from the motion vector of the tracking target on the basis of the input instruction; and
generate drive information of only the specific tracking direction on the basis of the extracted motion component in the specific tracking direction.

11. An imaging control method of controlling a camera including an imaging unit including an imaging lens and an imaging element, a pan and tilt mechanism capable of rotating the imaging unit in a pan direction and a tilt direction, and a pan and tilt driver that drives the pan and tilt mechanism, the imaging control method comprising:
a motion vector calculation step of calculates a motion vector of a tracking target on the basis of a moving image obtained by the camera;
a tracking direction instruction input step of receiving, via a user interface, an input of an instruction indicating a specific tracking direction for tracking the tracking target;
a tracking direction motion component extraction step of extracting a motion component in the specific tracking direction from the motion vector of the tracking target on the basis of the input instruction; and
a drive information generation step of generating drive information of only the specific tracking direction on the basis of the extracted motion component in the specific tracking direction.

12. A computer-readable non-transitory storage medium having a program that controls a camera including an imaging unit including an imaging lens and an imaging element, a pan and tilt mechanism capable of rotating the imaging unit in a pan direction and a tilt direction, and a pan and tilt driver that drives the pan and tilt mechanism, the program causing a computer to execute:
a motion vector calculation step of calculates a motion vector of a tracking target on the basis of a moving image obtained by the camera;
a tracking direction instruction input step of receiving, via a user interface, an input of an instruction indicating a specific tracking direction for tracking the tracking target;
a tracking direction motion component extraction step of extracting a motion component in the specific tracking direction from the motion vector of the tracking target on the basis of the input instruction; and
a drive information generation step of generating drive information of only the specific tracking direction on the basis of the extracted motion component in the specific tracking direction.

* * * * *